United States Patent [19]
Nobusawa

[11] 3,821,754
[45] June 28, 1974

[54] EXPOSURE TIME CONTROLS FOR CAMERAS

[75] Inventor: Tsukumo Nobusawa, Tokyo, Japan

[73] Assignee: Asahi Kogaku Kogyo Kabushiki Kaisha, Tokyo-to, Japan

[22] Filed: Aug. 2, 1971

[21] Appl. No.: 167,966

[30] Foreign Application Priority Data
Aug. 8, 1970 Japan.............................. 45-69364

[52] U.S. Cl....................... 354/24, 354/31, 354/51
[51] Int. Cl.......................... G03b 7/08, G03b 9/62
[58] Field of Search................................ 95/10 CT

[56] References Cited
UNITED STATES PATENTS

| | | | |
|---|---|---|---|
| 3,422,738 | 1/1969 | Mori et al. | 95/10 CT |
| 3,433,140 | 3/1969 | Wick et al. | 95/10 CT |
| 3,470,798 | 10/1969 | Miyakawa | 95/10 CT |
| 3,602,717 | 8/1971 | Konig | 95/10 CT |
| 3,648,053 | 3/1972 | Sato | 95/10 CT |
| 3,683,766 | 8/1972 | Nobusawa | 95/10 CT |

Primary Examiner—Richard M. Sheen
Assistant Examiner—Russell E. Adams, Jr.
Attorney, Agent, or Firm—Steinberg & Blake

[57] ABSTRACT

An electrical system for automatically determining, in cameras, exposure time, particularly under low-light conditions. The system includes an RC circuit made up of a photoconductor and capacitor connected in series, a trigger circuit connected to the RC circuit to be triggered thereby when a given trigger level is reached and a structure responding to triggering of the trigger circuit for initiating an exposure-terminating operation. The photoconductor, the capacitor, and the trigger circuit form three units to any one of which a compensating circuit is electrically connected for the purpose of automatically increasing the exposure time under low-light conditions, so as to compensate in this way for photographs which are made when relatively little light is available.

10 Claims, 6 Drawing Figures

EXPOSURE TIME CONTROLS FOR CAMERAS

BACKGROUND OF THE INVENTION

The present invention relates to cameras.

More particularly, the present invention relates to cameras provided with electrical systems for automatically determining exposure time.

As is well known, at average light intensities film which is to be exposed for making a photograph will have a linear characteristic curve. However, under conditions of low light this characteristic curve is no longer linear, and the present invention relates particularly to an automatic exposure time determining system which will compensate for the non-linear characteristic of the film when exposures are made under low-light conditions.

Film is conventionally exposed for a period of time which is capable of being automatically determined in accordance with the intensity of the light at the object which is to be photographed, and systems of this latter type which are generally electrical have conventionally been incorporated into cameras so as to automatically operate a shutter thereof for determining the exposure time. Exposure times which are conventionally determined in this way are regulated by exposing the film for a time period determined by the intensity of the light at the object with this latter intensity being limited to a relatively narrow range.

Thus, there is a failure in the known conventional exposure time determining structures to deal with the problem of automatically operating a camera shutter to provide a proper exposure time in situations where the object to be photographed is illuminated with light of relatively high or relatively low intensity beyond the relatively limited range of light intensity for which conventional systems are designed.

Photographic film, because of the nature of the light-sensitive material of which it is composed, has a characteristic curve where the film, even if it has a given $\beta$ value will nevertheless have over-exposure and under-exposure ranges where this characteristic curve cannot be linear so that there no longer exists a proportional relationship between the intensity of the light and the density of the image which is captured on the film. This relationship depends upon several factors such as the type of developing solution used to develop the exposed film and the time or duration of the development.

Thus, with automatic shutter controlling structures which are known it is impossible to accurately follow the characteristic of the film in the case where this characteristic is no longer proportional to the intensity of light at ranges of relatively high and relatively low light intensities, even in the case where the electrically controlled shutter is operated to satisfy the requirement of amounts of exposure as given by the relationship:

$$E = I \cdot t \quad (1)$$

where

E is the amount of exposure,
I is the light energy, and
t is the exposure time.

As a result, in the case where an electrically controlled shutter operates to determine exposure time in accordance with the above equation, in ranges of relatively high and relatively low light intensity, soft negatives of inadequate density are produced.

SUMMARY OF THE INVENTION

It is accordingly a primary object of the present invention to avoid the above drawbacks.

In particular, it is an object of the present invention to provide an electrical system for automatically determining exposure time in a manner which will automatically achieve a compensation by automatically increasing the exposure time when exposures are made under conditions of low light intensity.

In particular, it is an object of the present invention to provide an electrical system which can automatically determine the extent to which the exposure must be prolonged in accordance with the extent of relatively low light intensity under which a photograph is made.

Furthermore it is an object of the present invention to provide an electrical system which will eliminate any current leakage.

Also, it is an object of the present invention to provide an electrical system with a compensating circuit of the above type having a construction which enables it either to be conveniently incorporated into new cameras or which enables the compensating system to be incorporated into existing cameras having conventional automatic exposure time determining circuits.

In accordance with the invention the drawbacks of the prior art are overcome by automatically determining an exposure time which will compensate for the film-sensitizing effect of the light, under requirements where the exposure amount for a relatively low light intensity range is determined by the relationship;

$$E = I \cdot \beta \cdot t \quad (2)$$

where the sensitizing efficiency $\beta$ has a value $0 < \beta < 1$.

Thus, in accordance with the above relationship the exposure time can follow the film characteristic insofar as the relationship $t/\beta$ with respect to the range of medium or average light intensity is satisfied in the range of relatively low light intensity, and this result is achieved by prolonging the exposure time in the case where a photograph is made of an object under conditions of relatively low light intensity.

According to the invention the exposure time is automatically determined by an electrical system which includes an RC timer circuit which includes a photoconductor for achieving operation of this circuit in accordance with information pertaining to the intensity of the light at the object to be photographed, this light intensity being detected by the photoconductor of the RC circuit. With certain embodiments of the invention there is an additional photoconductor which receives light from the object, and this additional photoconductor when receiving light of relatively low intensity brings about a change in the exposure time which would be determined by the RC timer circuit itself in such a way that this exposure time is prolonged under conditions where an object is photographed in a range of relatively low light intensity. However, there are also embodiments of the present invention according to which a photosensitive element such as the second photoconductor referred to above is replaced instead by an electric current regulating structure controlled by the signal in accordance with the light intensity at the object which is photographed and acting under conditions of low light intensity also to prolong the exposure time which otherwise would be achieved only by the RC timer circuit itself.

Thus, in accordance with the invention, the electrical system which automatically determines the exposure time includes an RC circuit composed of a photoconductor and capacitor connected in series, and a trigger circuit electrically connected to the RC circuit to be triggered thereby when a given trigger level is reached, an exposure time terminating means being electrically connected to the trigger circuit to be set into operation thereby for initiating an exposure terminating operation such as initiating the closing of the shutter. The photoconductor and capacitor of the RC circuit and the trigger circuit respectively form three units to any one of which a compensating circuit of the invention is operatively connected for the purpose of compensating for photographs made under low-light conditions in such a way as to increase automatically the duration of the exposure in accordance with the extent of low light intensity under which an object is photographed

BRIEF DESCRIPTION OF DRAWINGS

The invention is illustrated by way of example in the accompanying drawings which form part of this application and in which.

DESCRIPTION OF PREFERRED EMBODIMENTS

Figure 1:
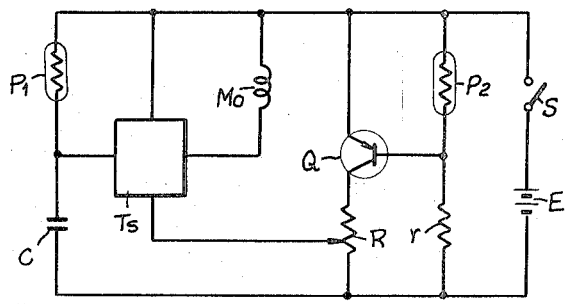
FIGS. 1–6 are wiring diagrams respectively illustrating different embodiments of electrical systems according to the invention.

Referring to FIG. 1, the electrical system of the invention which is illustrated therein includes an RC circuit means composed of a photoconductor $P_1$ and a capacitor C connected in series with the photoconductor. The photoconductor $P_1$ is carried by the camera in a well known manner according to which it will receive light from the object which is to be photographed, and thus the resistance of the photoconductor $P_1$ will have a value determined by the light intensity, as is well known. This RC circuit means forms a conventional timer circuit capable of being energized from a power source E upon closing of the switch S. A trigger circuit means $T_s$ in the form of a transistorized trigger circuit, also well known in the art, is electrically connected to a junction between the photoconductor $P_1$ and the capacitor C so that the switching of the transistorized trigger circuit $T_s$, or in other words the instant when it reaches its trigger level, is determined by the RC circuit means. An exposure terminating means $M_o$ is electrically connected to the trigger circuit means $T_s$ to be actuated thereby when the trigger level thereof is reached in accordance with the controls from the RC timer circuit. In the illustrated example this exposure terminating means $M_o$ takes the form of an electromagnet which in response to actuation by the trigger circuit means when the latter reaches its trigger level brings about closing of the shutter. Thus the exposure-terminating means is actuated by the trigger circuit means to initiate an exposure terminating operation. The shutter is initially opened in a well known manner in order to start the exposure, and in response to actuation of the exposure-terminating means $M_o$ by the trigger circuit means $T_s$ the shutter closes so as to terminate the exposure.

A resistance means R is electrically connected to the trigger circuit means $T_s$ for determining the trigger level thereof. This resistance means R forms in the example of FIG. 1 part of a compensating circuit means which includes a transistor Q the collector of which is electrically connected to the resistance means R so that the trigger voltage of the trigger circuit means $T_s$ will be determined by electric current as regulated by the transistor Q. The compensating circuit means of FIG. 1 further includes a second photoconductor $P_2$ and a resistor r connected in series therewith. The base of the transistor Q is connected to a junction between the second photoconductor $P_2$ and the resistor r. This second photoconductor $P_2$ also is carried by the camera in such a way that it will receive light from the object which is to be photographed. Thus, in the compensating circuit means of FIG. 1 the photoconductor $P_2$ and the resistor r form biasing resistors operatively connected to the transistor Q for biasing the latter from a non-conductive to a conductive state in response to low light conditions. As is well known the photoconductors $P_1$ and $P_2$ have a resistance which automatically increases as the intensity of light diminishes. Thus, the resistance of the photoconductor $P_2$ will increase under conditions of low light to a value where the internal resistance of the photoconductor $P_2$ is high enough, at a range of low light intensity, to render the transistor Q conductive.

Thus, with this electrical system of FIG. 1 when the switch S is closed, the circuit is energized from the source E, and the RC circuit means as well as the compensating circuit means are both simultaneously energized from the source E. Under conditions where the light intensity at the object to be photographed is in a range of relatively high or average light intensity, the transistor Q is in a non-conductive state, irrespective of the particular internal resistance of the photoconductor $P_2$ of the compensating circuit means, and under these conditions the exposure time is determined in a conventional manner in accordance with the exposure time as regulated by the RC timer circuit alone. However, when an object is photographed in a relatively low light intensity range, the transistor Q becomes conductive in accordance with the bias voltage produced by the divided voltage of the photoconductor $P_2$ and the resistor r. Therefore, the trigger voltage of the trigger circuit means $T_s$ is changed in accordance with the voltage drop as determined by the resistance means R. This trigger voltage will vary in accordance with the internal resistance variation of the second photoconductor $P_2$, which forms part of the compensating circuit means, and thus the trigger level which is adjusted automatically in this way corresponds to the light intensity at the object to be photographed under conditions of relatively low light intensity.

As a result, the trigger circuit means $T_s$ is still actuated by the RC circuit means formed by the photoconductor $P_1$ and the capacitor C, but the timing as determined by the RC circuit under these conditions will be change in accordance with the change of the trigger voltage. The result is that the exposure time is prolonged as compared with an exposure under normal lighting conditions where there has been no change in the trigger voltage by the operation of the compensating circuit means. Thus, FIG. 1 satisfies equation (2) above.

The exposure time $t$ of the electrically controlled camera shutter is in accordance with the following equation:

$$t = R_1 \cdot C \log E/E - V_c \tag{3}$$

where
R$_1$ is the internal resistance of the photoconductor P$_1$,
E is the source voltage,
V$_c$ is the trigger voltage, and
C is the capacity of the capacitor C. Thus, it is possible to prolong the exposure time $t$ by an operation increasing R$_1$, an operation increasing C, an operation increasing V$_c$, or an operation reducing E. Thus, with the system of the invention the photoconductor P$_1$ and the capacitor C of the RC circuit means and the trigger circuit means T$_s$ form three units any one of which may be electrically connected with the compensating circuit means of the invention for the purpose of prolonging the exposure time, and in the particular example of FIG. 1 the compensating circuit means is electrically connected with the trigger circuit means T$_s$ for increasing the trigger voltage V$_c$.

Figure 3:
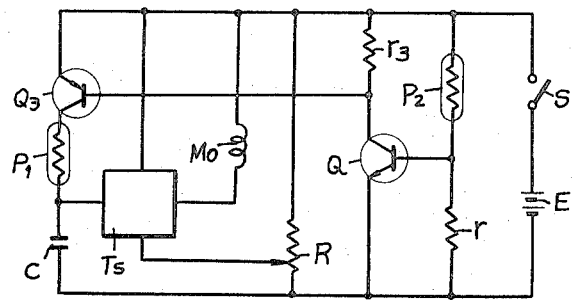
Figure 5:
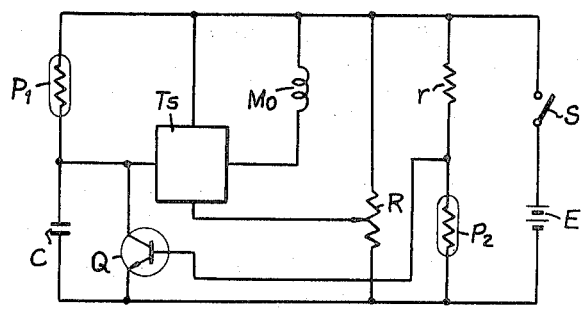
Figure 6:
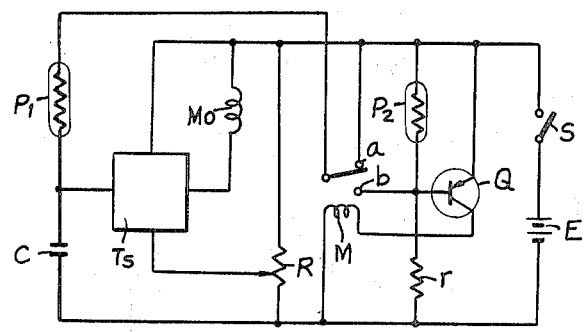

The embodiments respectively illustrated in FIGS. 3, 5 and 6 also include a compensating circuit means provided with a second photoconductor P$_2$.

Referring first to FIG. 3, the electrical system of this embodiment includes at its compensating circuit means a transistor Q similar to that of FIG. 1 in that its base is connected to a junction between biasing resistors formed by the second photoconductor P$_2$ and the resistor $r$. However, in the case of FIG. 3 an additional resistor $r_3$ is electrically connected to the collector of the transistor Q. An additional transistor Q$_3$ has its base connected to a junction between this additional resistor $r_3$ and the collector of the transistor Q. This transistor Q$_3$ has its collector connected to the photoconductor P$_1$ of the RC circuit means. Thus, this additional transistor Q$_4$ will have its bias voltage produced by the resistor $r_3$.

Thus, with the embodiment of FIG. 3 under conditions of low light the resistance of the second photoconductor P$_2$ of the compensating circuit means will reach a value high enough to render the transistor Q conductive, and the current flowing through the transistor Q$_3$ is regulated by the resistor $r_3$ which operates to maintain the base of the transistor Q$_3$ at a positive voltage so that the effect of increasing the internal resistance of the photoconductor P$_1$ of the RC circuit means is achieved, and thus the requirements of equation (2) above is satisfied in a range of low light intensity. Thus, with the embodiment of FIG. 3 the unit which is regulated by the compensating circuit means is the photoconductor P$_1$ of the RC circuit means, and with this embodiment it is the internal resistance R$_1$ of the photoconductor P$_1$, referred to in equation (3) above, which is increased in order to prolong the exposure time. Except for the above differences the embodiment of FIG. 3 is the same as that of FIG. 1.

Referring now to FIG. 5, the electrical system of this embodiment includes a compensating circuit means which has a transistor Q the base of which is connected to the junction between the biasing resistors formed by the resistor $r$ and the second photoconductor P$_2$, as described above. However, with the embodiment of FIG. 5 the emitter and collector of the transistor Q are connected in parallel with the capacitor C of the RC circuit means.

Thus, with this embodiment under conditions of low light the resistance of the second photoconductor P$_2$ will reach a value high enough to render the transistor Q conductive. As the base voltage of the transistor Q rises so that this transistor remains in the conductive state in accordance with the light intensity at the object under conditions where this light intensity is relatively low, the capacitor C will operate so that the effect of increasing its capacity is achieved, and thus the exposure time is prolonged to satisfy the above equation (2). Thus, this embodiment of FIG. 5 is one where the capacitor C forms the unit which is electrically connected to the compensating circuit means to be regulated thereby, and this embodiment will operate in such a way as to provide an operation where the capacity C of the above equation (3) is increased to prolong the exposure time.

Referring now to FIG. 6, in this embodiment also the compensating circuit means includes the transistor Q the base of which is connected to a junction between the biasing resistors formed by the resistor $r$ and the second photoconductor P$_2$. However, in this embodiment the collector of the transistor Q is electrically connected with a relay means M the coil of which is connected to the collector of transistor Q and the armature of which forms the movable switch element which normally engages the contact $a$ and which is displaced into engagement with the switch contact $b$ when the relay means is energized. The normal position of the movable switch blade engaging the contact $a$ connects the photoconductor P$_1$ into the electrical system in the manner shown in FIG. 6. Thus when the switch S is closed, the photoconductor P$_1$ will become energized and the exposure-determining operations will go forward in the usual way. The contact $b$ is also connected to the junction between the second photoconductor P$_2$ and the resistor $r$. These biasing resistors will of course bias the transistor Q from its non-conductive to its conductive state in the manner described above under conditions of low light. Where an object is photographed under average or relatively high light intensity the relay means M will not be energized and the switch will remain in its normal position closing the circuit of the photoconductor P$_1$ through the contact $a$. Thus, the exposure time will be determined under these conditions in a conventional manner. However, when an object is photographed under conditions of low light intensity, the transistor Q becomes conductive, so that the relay means M becomes energized, and thus the photoconductor P$_1$ is now connected to the contact $b$. As a result the current which flows through the RC circuit means includes not only that which flows through the photoconductor P$_1$ but also that which flows through the photoconductor P$_2$, and now the RC timing circuit means operates, because of the potential drop in the power source E, in the same way as if the internal resistance of the photoconductor P$_1$ were increased. Thus, under conditions of low light the embodiment of FIG. 6 also satisfies the above equation (2), and in this embodiment it is the photoconductor P$_1$ which forms the unit which is regulated by the compensating circuit means, the latter bringing about an operation according to which the internal resistance of the photoconductor unit is increased to prolong the exposure time in accordance with the above equation (3).

Figure 2:
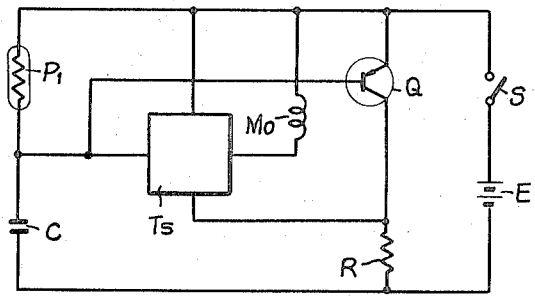
Figure 4:
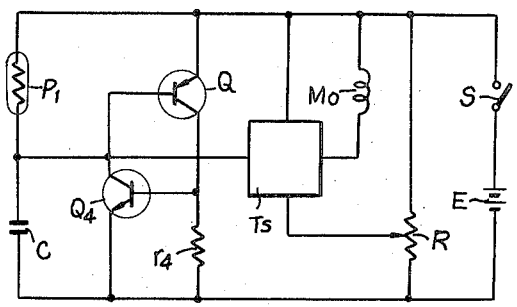

The embodiments of FIGS. 2 and 4 differ from the above-described embodiments in that these embodiments of FIGS. 2 and 4 do not include an additional photoconductor.

With the embodiment of FIG. 2, the electrical system is the same as that of FIG. 1 except that the transistor Q of the compensating circuit means has its collector connected to the resistance means R which is connected to the trigger circuit means $T_s$. The compensating circuit means of FIG. 2 does not include the biasing resistors of FIG. 1. Instead the base of the transistor Q is connected to the junction between the photoconductor $P_1$ and the capacitor C of the RC circuit means. Thus, with the embodiment of FIG. 2, the biasing potential, instead of being derived from the second photoconductor $P_2$ and the resistor $r$, as in FIG. 1, is derived from the junction between the photoconductor $P_1$ and the capacitor C. Thus, the embodiment of FIG. 2 operates in precisely the same way as the embodiment of FIG. 1 except that the biasing of the transistor Q from its non-conductive to its conductive state under conditions of low light is derived directly from the RC circuit means. Therefore this embodiment also operates to increase the trigger voltage $V_c$ of the trigger circuit means $T_s$ under conditions of low light, so that with this embodiment it is the trigger circuit means which is the unit regulated by the compensating circuit means and equation (2) is satisfied also with this embodiment, while the voltage $V_c$ of equation (3) above is increased with the embodiment of FIG. 2 in order to prolong the exposure time.

Referring now to FIG. 4, the compensating circuit means of this embodiment includes the transistor Q the collector of which is connected to a resistor $r_4$. Thus, this resistor $r_4$ is connected to the transistor Q in a manner similar to the connection of the resistance means R of FIG. 2 to the collector of the transistor Q of FIG. 2. However, the embodiment of FIG. 4 includes an additional transistor $Q_4$ the base of which is connected to a junction between the transistor Q and the resistor $r_4$, so that the bias voltage of the transistor $Q_4$ is determined by the voltage drop at the resistor $r_4$. The emitter and collector of the transistor $Q_4$ are connected in parallel with the capacitor C of the RC circuit means. With the embodiment of FIG. 4, as with the embodiment of FIG. 2, the base of the transistor Q is connected to the junction between the photoconductor $P_1$ and the capacitor C of the RC circuit means, and thus with the embodiment of FIG. 4 the transistor Q will be biased into its conductive state in accordance with the voltage drop at the junction between the photoconductor $P_1$ and capacitor C under conditions of low light intensity. Thus, the transistor $Q_4$ will also become conductive only under conditions of low light intensity, so that, as was the case with FIG. 5, the effect of increasing the capacity of the capacitor C is achieved and thus the exposure time is prolonged under low light conditions satisfying equation (2) above. Therefore, with the embodiment of FIG. 4 the capacitor C forms the unit which is regulated by the compensating circuit means, and this embodiment operates to perform the operation of increasing the capacity of the capacitor C, in accordance with the equation (3) above.

It is thus apparent from the above description that with all of the embodiments of the invention the illustrated circuitry forms an electrical circuit means which includes the photoconductor $P_1$, the capacitor C, and the trigger circuit means $T_s$. In all of the embodiments, the compensating circuit means which automatically responds to abnormal low lighting conditions for automatically achieving an increase in exposure time includes a transistor connected to the electrical circuit means so as to be rendered automatically conductive under conditions of abnormal low lighting conditions, so as to render the compensating circuit means operative in this way.

Thus, the electrical circuit means which includes the photoconductor $P_1$, the capacitor C, and the trigger circuit means $T_s$ will operate to provide proper exposures under normal lighting conditions where the light intensity fluctuates within a given range. The compensating means responds to abnormal low lighting conditions where the intensity of light is less than light intensities within this latter range, so that it is only under such abnormal low lighting conditions that the compensating circuit means operates to automatically achieve an increase in exposure time.

It is thus apparent from the above that according to the present invention the shutter of the camera will be automatically regulated to achieve an exposure time which will exactly follow the photographic characteristic of the film even under conditions where the object is photographed at a low light intensity. Therefore, negatives with improper densities, resulting with conventional controls, are eliminated when exposures are made with the structure of the invention under low light conditions.

The electrical system of the invention which operates effectively both under normal lighting conditions as well as under conditions of low light intensity is very useful particularly in cases where photographs are made in a theater, for example, where photographs with flash illumination are difficult to carry out.

With conventional electrically controlled shutters it is theoretically possible to prolong the exposure time in a manner simpler than is possible with mechanically operated shutters, but the known electrically operated shutters have inevitably involved exposure time errors which increase as the leakage current from the elements such as the transistors increases.

With the compensating circuit means according to the present invention, a predetermined trigger voltage is maintained by the resistance means R, thus eliminating leakage current while achieving the required prolongation of the exposure time, so that there is a perfect correction of the error which otherwise would be produced. This also is one of the advantages of the present invention.

It is to be noted that the structure could of course be arranged in such a way as to add a predetermined fixed exposure time prolongation under conditions where photographs are made with low light intensity simply by incorporating a given exposure time control device into relatively inexpensive cameras for achieving a fixed, predetermined increase in the exposure time when the light intensity is below a given level. However, with the above-described electrical systems of the invention the prolongation of the exposure time will depend upon the actual light intensity at the object which is photographed under conditions where this light intensity is relatively low, so that a far more precise control is achieved with the result of a perfect negative density.

Moreover, it is apparent that the desired results are achieved with the electrical system of the invention by adding a relatively small number of simple components to conventional exposure time determining structure. Therefore, the size of a camera need not be increased in order to accommodate the structure of the invention.

What is claimed is:

1. In an electrical system for automatically determining the time during which film in a camera is exposed, RC circuit means including a photoconductor and capacitor connected in series, said photoconductor receiving light from the object to be photographed for responding to the intensity of said light, trigger circuit means electrically connected with said RC circuit means to be triggered thereby when a given trigger level is reached, exposure-terminating means electrically connected to said trigger circuit means to be operated thereby for initiating an exposure-terminating operation when said trigger circuit means reaches said trigger level, said photoconductor, capacitor, and trigger circuit means providing proper exposures under normal lighting conditions where the light intensity fluctuates within a given range and forming three units any one of which may be regulated for increasing the exposure time under abnormal conditions of low light intensity, where the intensity of light is less than the minimum light intensity within said range, and compensating circuit means electrically connected with one of said units for responding automatically to said abnormal low lighting conditions for automatically regulating said one unit to increase the exposure time, and an electrical circuit means including said photoconductor, said capacitor, and said trigger circuit means, said compensating circuit means including a transistor electrically connected with said electrical circuit means for transferring automatically from a non-conductive to a conductive state under said conditions of abnormal low light where the light intensity is less than the minimum light intensity within said given range of light intensity fluctuation, for automatically rendering said compensating cicuit means operative for automatically regulating said one unit under said abnormal low lighting conditions.

2. The combination of claim 1 and wherein said compensating circuit means is electrically connected with said trigger circuit means for increasing the trigger voltage thereof in response to low lighting conditions.

3. The combination of claim 2 and wherein said compensating circuit means includes, in addition to said transistor, a second photoconductor for receiving light from the object to be photographed, a resistor connected in series with said second photoconductor, the latter and said resistor electrically connected with the base of said transistor for biasing the latter, and resistor means electrically connected with a collector of said transistor and with said trigger circuit means for increasing the trigger voltage thereof when said transistor is biased from a non-conductive to a conductive state by said second photoconductor and resistor connected in series therewith.

4. The combination of claim 2 and wherein said transistor has a base electrically connected to a junction between said photoconductor and capacitor, and said compensating circuit means further including a resistance means electrically connected to a collector of said transistor and to said trigger circuit means for increasing the trigger voltage thereof when said transistor is biased from a non-conductive to a conductive state in response to biasing from said junction between said photoconductor and cacitor.

5. The combination of claim 1 and wherein said compensating circuit means is electrically connected with said photoconductor for increasing the resistance thereof.

6. The combination of claim 5 and wherein said transistor of said compensating circuit means forms a first transistor, and said compensating circuit means further including a second photoconductor for responding to light from the object to be photographed, a first resistor connected in series with said second photoconductor, said first transistor having its base electrically connected to a junction between said second photoconductor and first resistor to be biased thereby from a non-conductive to a conductive state in response to low lighting conditions, a second resistor connected to a collector of said first transistor, and a second transistor having a collector connected in series with said first-named photoconductor of said RC circuit means and a base connected to a junction between said second resistor and said collector of said first transistor, so that in response to low lighting conditions the effect of increasing the resistance of said first-named photoconductor is achieved.

7. The combination of claim 5 and wherein said compensating circuit means includes, in addition to said transistor, relay means electrically connected to a collector of said transistor, a second photoconductor for responding to the lighting conditions at the object to be photographed, a resistor connected in series with said second photoconductor, said transistor having a base electrically connected to a junction between said photoconductor and resistor to be biased thereby from a non-conductive to a conductive state in response to low-lighting conditions, so that when said transistor becomes conductive said relay means is energized, and switch means electrically connected with said photoconductor of said RC circuit means and with said junction between said second photoconductor and resistor for responding to energizing of said relay means for electrically connecting said photoconductor of said RC circuit means to said junction to achieve the effect of increasing the resistance of said photoconductor of said RC circuit means in response to low lighting conditions.

8. The combination of claim 1 and wherein said compensating circuit means is electrically connected with said capacitor.

9. The combination of claim 8 and wherein said compensating circuit means includes a first transistor having an emitter and collector electrically connected in parallel with said capacitor, a resistor and a second transistor having a collector connected in series with said resistor and said second transistor forming said transistor connected to said electrical circuit means for rendering said compensating circuit means automatically conductive under abnormal low lighting conditions, said first transistor having a base electrically connected with a junction between said second transistor and resistor, and said second transistor having a base electrically connected with a junction between said photoconductor and capacitor to be biased for rendering said first transistor operative.

10. The combination of claim 8 and wherein said transistor of said compensating circuit means has an emitter and collector connected in parallel with said capacitor, said compensating circuit means further including a second photoconductor for responding to lighting conditions at the object to be photographed, a resistor in series with said second photoconductor, and said transistor having its base electrically connected with a junction between said second photoconductor and resistor to be biased thereby for achieving the effect of increasing the capacitance of said capacitor in response to low lighting conditions.

* * * * *